April 8, 1952   A. V. FROHNAPEL   2,592,412
LID FOR REFRIGERATING APPARATUS
Filed June 13, 1947   2 SHEETS—SHEET 1
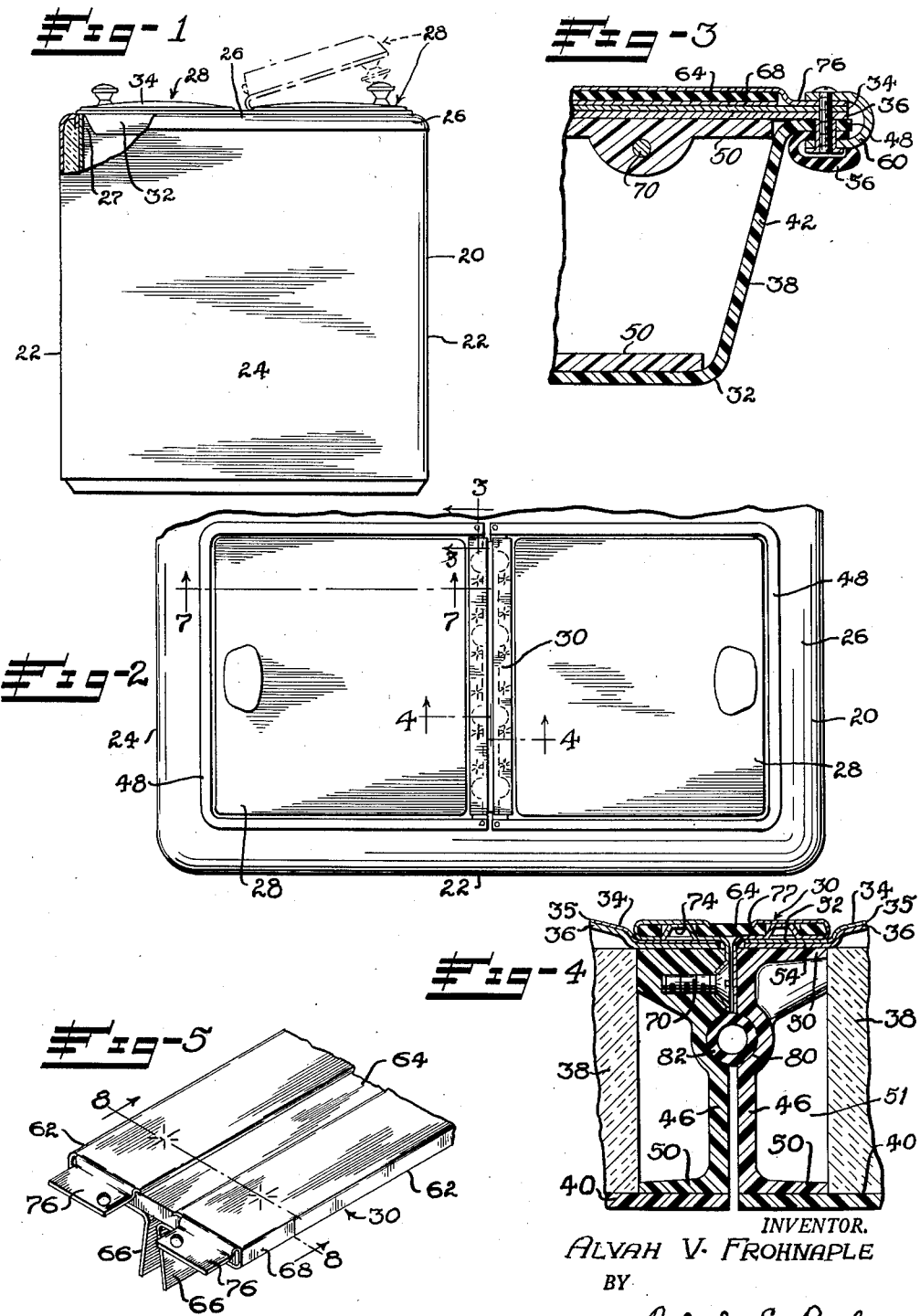

April 8, 1952     A. V. FROHNAPEL     2,592,412
LID FOR REFRIGERATING APPARATUS
Filed June 13, 1947     2 SHEETS—SHEET 2
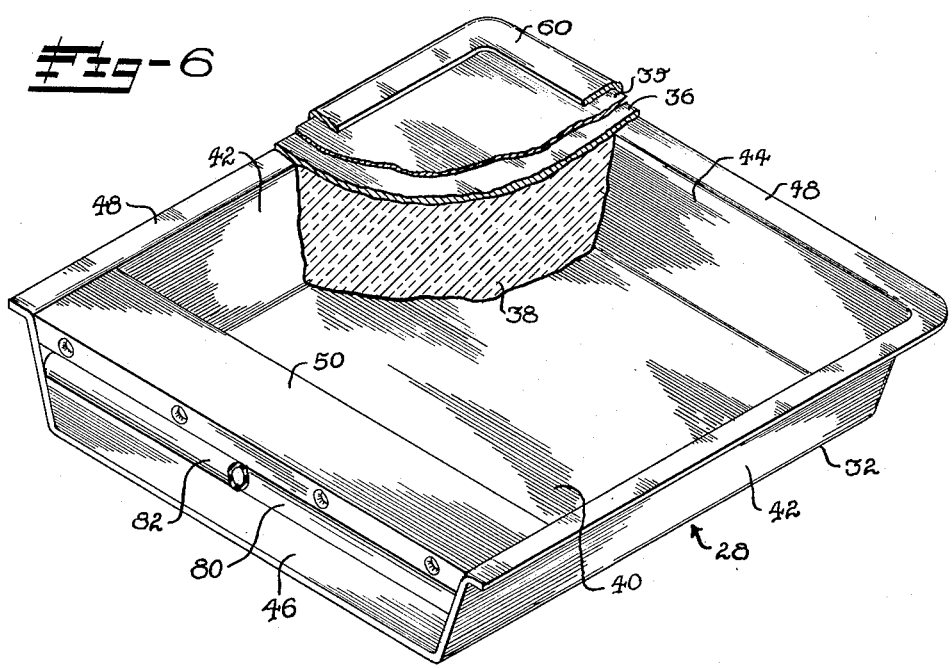
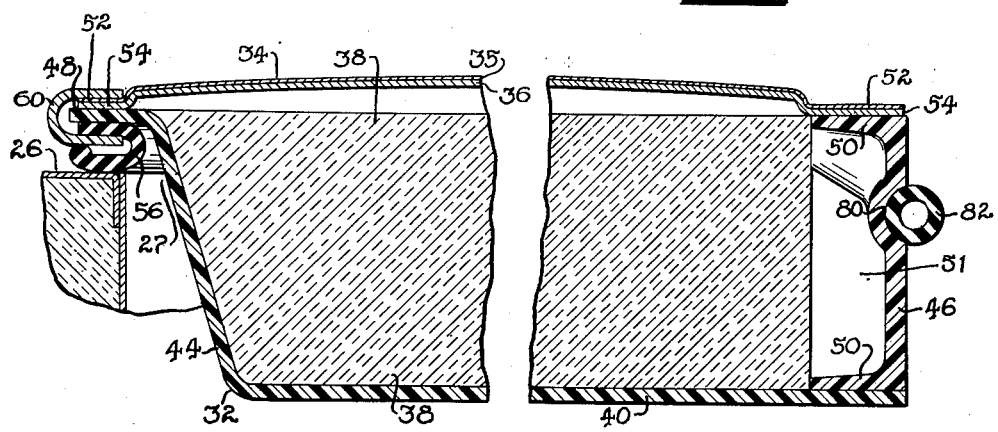
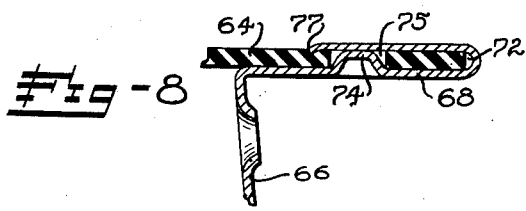
INVENTOR.
ALVAH V. FROHNAPLE
BY
Ralph E. Baker
ATTORNEY Patented Apr. 8, 1952

2,592,412

UNITED STATES PATENT OFFICE 2,592,412

LID FOR REFRIGERATING APPARATUS

Alvah V. Frohnapel, Detroit, Mich., assignor to Nash-Kelvinator Corporation, Detroit, Mich., a corporation of Maryland Application June 13, 1947, Serial No. 754,376

2 Claims. (Cl. 220—24)

This invention relates generally to refrigerating apparatus and more particularly to ice cream cabinet closure lids.

It is an object of the present invention to provide an improved ice cream cabinet lid of a durable structural character, yet one which is economical to manufacture.

Another object of the invention is to provide improved, hinged together ice cream cabinet lids of a character which may be readily assembled.

Another object of the invention is to provide an improved ice cream cabinet lid of composite construction having interconnecting parts, substantially to eliminate exposed fasteners.

Another object of the invention resides in the sealing of the joint between hinged edges of a pair of ice cream cabinet lids.

Further objects and advantages of the present invention will be apparent from the following description, reference being had to the accompanying drawings, wherein a preferred form of the present invention is clearly shown.

In the drawings:

Fig. 1 is an end view of an ice cream refrigerator cabinet embodying features of my invention;

Fig. 2 is a fragmentary, plan view of the refrigerator cabinet including a pair of hinged together cover lids;

Fig. 3 is a sectional view of one of the lids, taken along the line 3—3 of Figure 2;

Fig. 4 is a sectional view of the lids at the hinges, taken along the line 4—4 of Figure 2;

Fig. 5 is a fragmentary, isometric view of the hinge;

Fig. 6 is an isometric view partly broken away and in section of one of the lids;

Fig. 7 is a sectional view of one of the lids, taken along the line 7—7 of Figure 2; and Fig. 8 is an enlarged, fragmentary cross sectional view of the lid hinge.

In the drawings, there is shown, a refrigerating apparatus cabinet 20 of a type suitable for storage of ice cream, package goods, etc. The cabinet 20 may be of general rectangular shape in cross section having side walls 22, end walls 24 and a top wall 26. In the cabinet top wall 26, a number of openings 27 provide access to the storage compartment of the cabinet, the openings each being closed by a pair of covers or lids 28 connected together by a hinge 30.

Each of the cabinet lids 28 is of composite construction and comprises in general, an inner dishlike lid member or pan 32 and an outer lid member or pan 34. Heat insulation 38, which may be of any suitable type, is preferably provided between the inner and outer lid pans 32, 34 to decrease heat leakage into the storage compartment of the cabinet. The inner dish-like lid member 32 is preferably made of a material of low heat conductivity, such as phenolic plastic whereas the outer lid pan 34 is a composite structure of two, secured together metal sheets 36, 36. Of these metal sheets, the inner sheet 36 is preferably made of relatively thick sheet steel to provide strength and rigidity to the lid and the other or outer sheet 35 is made of a relatively thin sheet of corrosive resistant material, such as stainless steel. As shown, the stainless steel sheet 35 lies flat against and conforms to the outer contour of the inner steel sheet 36, the pan 34 and its complementary rust resisting cover sheet 35 preferably being slightly arched or curved outwardly to give added strength and rigidity thereto. Preferably, the sheets of the outer pan are welded together prior to assembly of the lid parts.

Preferably, the lids 28 are of rectangular shape in cross section, the inner pan 32 thereof having a bottom 40, opposite sides 42 and opposite ends 44 and 46. The pan sides 42, end 44 and bottom 40 are formed or molded integral and are provided with an outwardly directed, marginal portion or flange 48 extending along the upper edges thereof. The other end 46 of the lid inner pan 32 is preferably a separately made part which, in addition to forming an end of the lid, supports the hinge 30. This end member 46 of the inner pan 32 is preferably of general channel shape in cross section for strength and rigidity having a web, upper and lower inwardly directed marginal portions or flanges 50, and opposite end flanges 51. The hinge supporting end 46 of the lid may have its bottom flange 50 and end flanges 51 respectively cemented to the bottom 40 and sides 42 of the inner pan or these parts may be secured together in any other suitable manner. The upper flange 50 of the end members 46 is substantially coplanar with the outwardly directed marginal portion or flange 48 of the lid inner pan. An inwardly offset, outer marginal portion or flange 54 of the outer lid member 34 overlaps and seats on the flanges 48, 50 of the lid inner pan 32. These overlapping, outer marginal portions of the lid together with a sealing gasket 56 are received and clamped together by a clamping strip 60 which also functions as a finish or trim strip. The gasket 56 extends along the lid sides 43 and end 44, against the underside of the lid flange 48 to seat on the upper surface of the cabinet top wall when the lid is closed as shown. The clamping and finish strip 60 is U-shaped in cross section to receive the overlapping outer marginal portions of the lid pans 32, 34 and of the gasket 56. Also, the clamping and finish strip 60 is U-shaped, as seen in the plan view of the cabinet (Fig. 2); the clamping strip extending along the side and one end edge of the lid or along all but the hinge end of the lid. With the lid parts held together, such as by a suitable jig (not shown) the U-shaped clamping strip 60 may be slid endwise over the lid pans and gasket marginal portions after which the sides of the U-section clamping strip are forced or pressed together under suitable pressure to hold the lid parts together. The outer marginal portions of the inner and outer lid pans at the hinge end of the lid are secured together by the lid hinge 30.

The hinge 30 comprises, a pair of elongated hinge or butt members 62 and a pliable or flexible connecting member 64. As shown in Fig. 2, the hinge butts 62 are laterally positioned in spaced parallel relation and are connected together by the pliable connecting member 64, the hinge extending along substantially the entire length of the lid hinge ends. The hinge butt connecting member 64 may comprise a strip of suitably pliable material preferably a durable and somewhat flexible material, such as, rubberized fabric. In order to provide an inexpensive, lightweight hinge, I make the hinge butts 62 of thin sheet metal, formed, as will later be seen, to be secured to the connecting member 64 without need of exposed fastening means. The hinge members 62 are each of angle shape in cross section having a pair of legs 66 and 68. The legs 66 of the hinge 30 are respectively secured flat against opposed surfaces of the lid hinge ends 46, preferably by countersunk screws 70. The hinge butt legs 68 are reversely bent back in spaced relation thereto forming channels 72 in which opposite marginal side edge portions of the rubberized connecting member 64 are received and held. In the leg 68 of each hinge butt, a plurality of longitudinally spaced weld projections or bosses 74 is provided which extend respectively through a plurality of apertures 75 provided in the rubberized connecting member 64, the projections 74 extending to the underside of the reversely bent leg portions of the channels 72. In assembling the hinge, the reversely bent leg portions of the channels 72 are forced inwardly against the rubberized connecting member 64 which is then somewhat displaced or is under pressure and the sides of the channels 74 are then welded together, thus securing the hinge butts to their connecting member 64 without need of exposed fasteners. Preferably the opposed edges of the channels 72 are bent downwardly, as at 77, to embed in the rubberized connecting member 64 to aid in attaching the parts together and further to avoid having rough, exposed edges of the hinge on which the hands may be scratched or cut. The upper leg of the hinge butt 62 overlaps and seats flat against the outer marginal portion of the lid outer pan 34 holding the outer lid pan to the hinge end wall 46 without need of screws or other and similar fasteners. To aid in holding the outer and inner lid pans 32, 34 together at the hinge end of the lid, I form the angle hinge butts with an acute angle so that the legs 66, 68 are forced apart to conform to the upper, exterior right angle of the lid end 46 when the screws are drawn down, thus tensioning the legs so that a downward force is exerted by the hinge leg 68 on the marginal portion of the outer pan 34, clamping the pan along this margin to the upper flange 50 of the lid or hinge supporting end 46. At opposite ends of each of the hinge butts, extended, downwardly offset end portions 76 engage respectively in the U-section clamping and finish strip sides 48 where a single screw and nut is provided adjacent each end of the clamping strip, securing the inner and outer lid pans 32, 34, gasket 56 and hinges together.

In the opposed outer surfaces of the lid hinge ends 46, I provide oppositely disposed, elongated recesses 80 which extend substantially the length of the lids. In one of these recesses 80, I cement a resilient seal 82, preferably a tubular shaped member of rubber or rubberized material which, when the lids are closed engages in the recess of the adjacent lid sealing the joint therebetween.

From the foregoing description, it will be noted that I have provided an improved ice cream cabinet lid of inexpensive light weight construction, yet one which is strong and durable. Also, I have provided a composite lid construction which may be readily assembled due to the interconnecting relationship of the parts which eliminates largely the need for exposed fasteners to connect the parts together. In this connection, I have provided a pair of hinged together lids in which the hinge serves to hold the lid parts together. In addition I have provided a pair of hinged together lids having provisions for sealing the joint therebetween when the lids are closed.

Although only a preferred form of the invention has been illustrated, and that form described in detail, it will be apparent to those skilled in the art that various modifications may be made therein without departing from the spirit of the invention or from the scope of the appended claims.

I claim:

1. A rectangular lid for closing an opening in the top of a refrigerator cabinet comprising, an inner relatively deep pan member having an outturned flange extending along three sides thereof and having an inturned flange extending along the fourth side, an outer relatively shallow pan member having an outer marginal portion seating on said flanges, an intermediate pan member conforming to the contour of said outer pan member having an outer marginal portion between said first flanges and the marginal portion of said panel, a clamping-strip of U-shape cross section receiving and clamping said outturned flange and marginal portions together along said three sides, and a hinge member clamping said inturned flange and said outturned flange and the marginal portions of said intermediate pan member together along said fourth side.

2. A lid for closing an access opening in a refrigerator cabinet comprising, an inner lid member of low heat conducting material having bottom, sides and one end, and having an outer marginal portion along the sides and end thereof, a hinge supporting end member of channel shape disposed between the sides of said inner lid member in spaced relation to said first-named end, said hinge supporting end member having an inwardly directed flange substantially coplanar with said outer marginal portions, an outer lid member of sheet metal material having outer marginal portions overlapping said first-named marginal portion and said inturned flange, a trim member of U-shaped cross section receiving and clamping the marginal portions together, and a hinge on said hinge supporting end member having opposite end portions engaged in said U-shaped trim member.

ALVAH V. FROHNAPEL.

REFERENCES CITED

The following references are of record in the file of this patent:

UNITED STATES PATENTS

| Number | Name | Date |
|---|---|---|
| Re. 18,941 | King | Sept. 12, 1933 |
| 601,040 | Hewens | Mar. 22, 1898 |
| 647,379 | Davis | Apr. 10, 1900 |
| 1,593,650 | Bultman | July 27, 1926 |
| 1,650,791 | Gibson | Nov. 29, 1927 |
| 1,932,822 | Holbrook | Oct. 31, 1933 |
| 2,007,154 | Bowes | July 9, 1935 |
| 2,008,325 | Holbrook | July 16, 1935 |
| 2,047,461 | Doyle | July 14, 1936 |
| 2,241,101 | Teeter | May 6, 1941 |
| 2,242,421 | Dodge | May 20, 1941 |
| 2,276,205 | King | Mar. 10, 1942 |
| 2,321,753 | King | June 15, 1943 |
| 2,331,512 | Siedschlag | Oct. 12, 1943 |
| 2,365,231 | Wegman | Dec. 19, 1944 |